US008955137B2

(12) United States Patent  
Mousty et al.

(10) Patent No.: US 8,955,137 B2  
(45) Date of Patent: Feb. 10, 2015

(54) SYSTEM AND METHOD FOR UPLOADING AND VERIFYING A DOCUMENT

(71) Applicant: State Farm Mutual Automobile Insurance Company, Bloomington, IL (US)

(72) Inventors: Jeffrey Mousty, Normal, IL (US); John Dillard, Bloomington, IL (US); Surendra Karnatapu, Bloomington, IL (US); Robert Fatima, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 13/777,390

(22) Filed: Feb. 26, 2013

(65) Prior Publication Data

US 2014/0181969 A1 Jun. 26, 2014

Related U.S. Application Data

(60) Provisional application No. 61/745,072, filed on Dec. 21, 2012.

(51) Int. Cl.
*G06F 12/00* (2006.01)
*G06F 17/30* (2006.01)
*H04L 29/06* (2006.01)

(52) U.S. Cl.
CPC ...... *G06F 17/30194* (2013.01); *H04L 63/1408* (2013.01)
USPC ...... 726/24; 726/1; 726/22; 726/23; 713/177; 709/219; 709/232

(58) Field of Classification Search
CPC .............. G06F 17/30; G06F 17/30067; G06F 17/30905; G06Q 10/10; H04N 21/658
USPC ............ 726/24, 1, 23; 713/177; 709/219, 232
See application file for complete search history.

(56) References Cited

U.S. PATENT DOCUMENTS

| 2002/0154327 | A1* | 10/2002 | Jones | 358/1.12 |
|---|---|---|---|---|
| 2003/0026612 | A1* | 2/2003 | Ohta | 396/429 |
| 2003/0033331 | A1* | 2/2003 | Sena et al. | 707/513 |
| 2005/0149749 | A1* | 7/2005 | Van Brabant | 713/200 |
| 2005/0273368 | A1* | 12/2005 | Hutten et al. | 705/4 |
| 2006/0174120 | A1* | 8/2006 | Rippy et al. | 713/171 |
| 2006/0230345 | A1* | 10/2006 | Weng et al. | 715/523 |
| 2008/0137126 | A1* | 6/2008 | Yoshida | 358/1.14 |
| 2009/0282485 | A1* | 11/2009 | Bennett | 726/24 |
| 2010/0174803 | A1* | 7/2010 | Holloway, Jr. | 709/219 |

(Continued)

*Primary Examiner* — Beemnet Dada
*Assistant Examiner* — Sayed Beheshti Shirazi
(74) *Attorney, Agent, or Firm* — Marshall, Gerstein & Borun LLP; Randall G. Rueth (57) ABSTRACT

An upload and verification system allows a user to upload files which the user would like to attached to the electronic record of a certain event associated with the company, for example, an insurance claim. A quarantine server may receive the uploaded file and scan the file for malicious code. The quarantine server may transmit the file to temporary storage server. The temporary storage server may receive the file, may convert the file to a file format supported by the company system and may compress the file. The temporary storage server may also transmit a preview of the file back to the client device, where the user can verify that the correct document has been uploaded and no mistakes have been made.

12 Claims, 7 Drawing Sheets

(56) References Cited

U.S. PATENT DOCUMENTS

| | | | |
|---|---|---|---|
| 2010/0180340 A1* | 7/2010 | Zola et al. | 726/22 |
| 2010/0205076 A1* | 8/2010 | Parson et al. | 705/30 |
| 2010/0251132 A1* | 9/2010 | Nishino | 715/743 |
| 2011/0238859 A1* | 9/2011 | Kitagata | 709/232 |
| 2012/0192273 A1* | 7/2012 | Turbin et al. | 726/23 |
| 2013/0097049 A1* | 4/2013 | Minsky | 705/26.5 |
| 2013/0097666 A1* | 4/2013 | Wu et al. | 726/1 |

* cited by examiner

SYSTEM AND METHOD FOR UPLOADING AND VERIFYING A DOCUMENT

CROSS REFERENCE TO RELATED APPLICATIONS

This application claims the benefit of U.S. Provisional Application No. 61/745,072, entitled "System and Method for Uploading and Verifying a Document" which was filed on Dec. 21, 2012, the entire disclosure of which is hereby incorporated by reference herein.

TECHNICAL FIELD

The present disclosure generally relates to a system and method for uploading a document, verifying the document and flagging the document as part of an electronic claim file.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Certain documents may be necessary in order for an insurance agent or other party to determine if a policy should be paid out and how much money is due. These files may include text documents, for example an insurance document of an adverse party or images, such as a copy of a driver's license or pictures of a car pre and post accident. Traditionally, files have been transmitted to the insurance company via mail, fax or in person. Customers and insurance agents mailed or faxed the files to a Central Imaging Operation Service (CIOS), where the files were scanned and converted to an electronic digital image. After each file was scanned, it was identified by claim number and document type, flagged as attached to the particular claim and stored in the electronic claim file. At that point the claim handler was able to electronically view the document within the electronic claim file. Prior art systems took one to three days from the time of transmission until the document was available in the electronic claim file.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Prior art document upload system architectures are not suited to the requirements of uploading and attaching a file to the insurance claim. For example, an uploaded document may not be in a file format which is supported by the system. Accordingly, the document must be converted to a supported format and displayed to the user, in real time, in order to allow the user to verify that it is a correct document and make sure there are no mistakes. Moreover, because files may be uploaded from computers not on the company's network, the files cannot be sent directly to the company's main server without first being scanned for malicious code such as trojans, viruses, etc.

In the present file upload and verification system, a company, such as an insurance company, may allow a user, such as company employees or customers to access a company website, discrete application, etc. on a client device. The user may also upload files which the user would like attached to the electronic record of a certain event associated with the company, for example, an insurance claim or an insurance policy. Once the user has logged into a company account, the user may see insurance claims they have pending with the insurance company. The uploaded file may be transmitted, via a network such as the internet, to a quarantine server, where the file is scanned for malicious code, viruses, etc. If the file scan performed on the quarantine server is successful, the file and user account credentials may be transmitted, via a computer network such as a local area network, wide area network, the internet, etc., to temporary storage server. The temporary storage server may receive the file/and or user credentials and may convert the file to a file format supported by the company system. The temporary storage server may also compress the file, if the file is above a certain threshold, such as a file size threshold. Furthermore, the temporary storage server may transmit a preview of the file back to the client device, where the user can verify that the correct document has been uploaded and no mistakes have been made.

In one embodiment, a computer implemented method for attaching a file to an insurance claim, receives at a computer a first file via a computer network, wherein the file is in a first file format and transmits, over the computer network, the file to a server. The method further determines, at a processor, whether the first file format is a supported file format and if it is determined that the first file format is not a support format, converting, at the processor, the first file to a supported file format.

The method further transmits, over the computer network, the first file for a confirmation that the file is appropriate and receives at the computer a confirmation in response to the confirmation transmission. The method further attaches, at the processor, the first file to the insurance claim; and stores the first file on a storage medium.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term " " is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
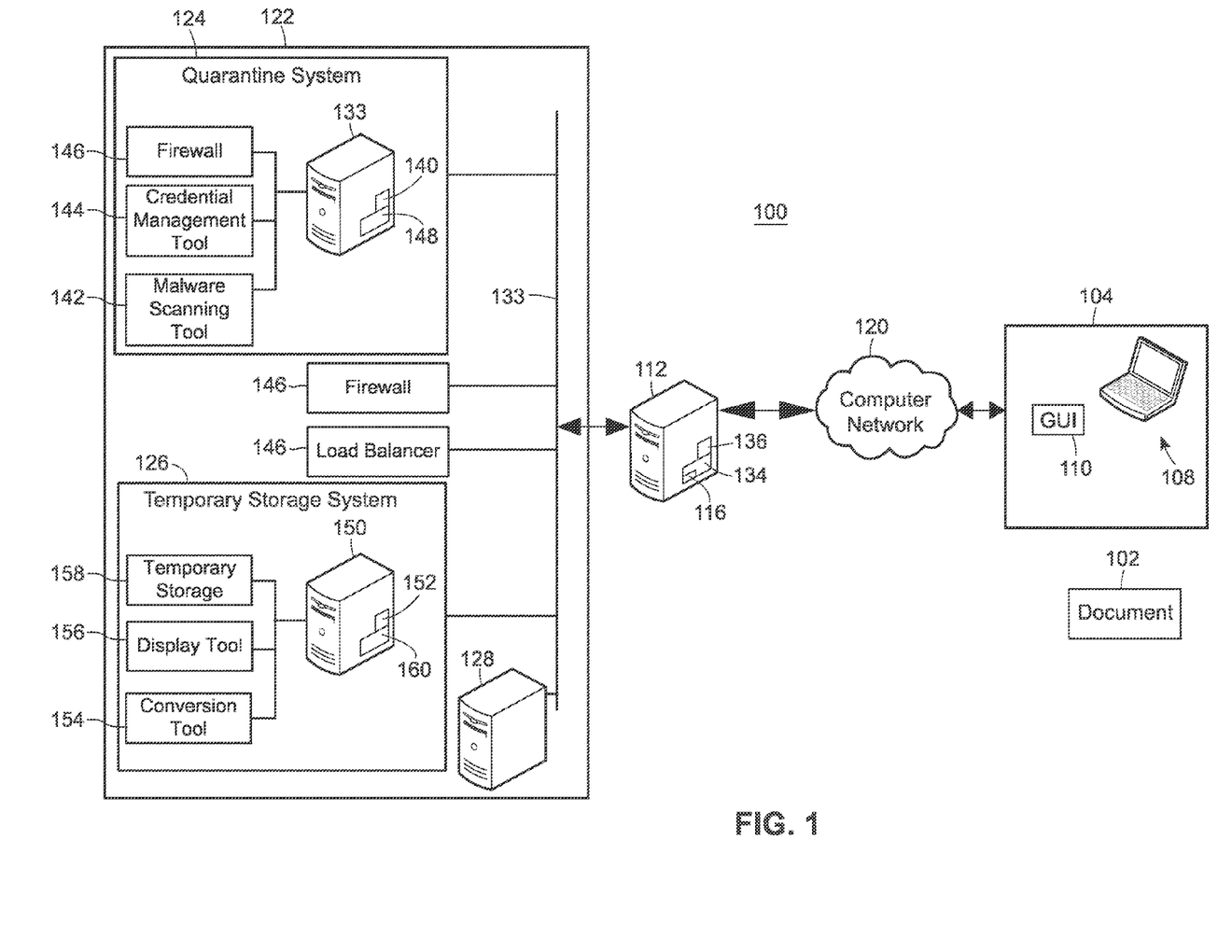
FIG. 1 is a simplified and exemplary block diagram of a system for uploading and verifying a file.

FIG. 1 illustrates various aspects of an exemplary architecture implementing a file upload and review system 100. The high-level architecture includes both hardware and software applications, as well as various data communications channels for communicating data between the various hardware and software components. The file upload and review system 100 may include various software and hardware components or modules that may employ a method to receive a file 102 and present the file 102 to the user for review. The file 102 may be, for example, a text document, image, etc.

The various modules may be implemented as computer-readable storage memories containing computer-readable instructions (i.e., software) for execution by a processor of the computer system 100. The modules may perform the various tasks associated with receiving a file 102 from a user, transmitting the file to a quarantine server, scanning the file, transmitting the file to a temporary storage server, converting to an acceptable format, presenting the file to the user for review, associating the file with an insurance claim and storing the file in a permanent storage, as herein described. In an embodiment, the file may be received from a user, such as a customer, an insurance agent, company employee, etc.

The file upload and review system 100 may include front end components 104, including a computing device 108 that connects to a web server 112 and is capable of executing a graphical interface (GUI) 114 for an upload tool 116 within a web browser application (not shown). A computing device 108 may include a personal computer, smart phone, tablet computer, or other suitable computing device. Those skilled in the art will recognize that the present system may be used in a dedicated application, a web browser, a combination thereof, etc.

In some embodiments, the computing device 108 executes instructions of a web server 112 to receive the file 102 via the GUI 110 at the computing device 108 via a computer network 120, such as the Internet or other type of suitable network (e.g., local area network (LAN), a metropolitan area network (MAN), a wide area network (WAN), a mobile, a wired or wireless network, a private network, a virtual private network, etc.).

The web server 112 may send and receive information such as computer-executable instructions and data associated with applications executing on the computing device 108. The applications executing within the system 100 may include cloud-based applications, web-based interfaces to back end components 122, software applications executing on the computing device 108, or applications including instructions that are executed and/or stored within any component of the system 100. The back end components 122 may receive the file 102 from the web server 112 via the computer network 120. The backend components 122 may communicate with the computing device 108 through the web server 112 via the computer network 120. The applications, GUI 110, web browser application (not shown), and other tools may be stored in various locations including separate repositories and physical locations.

The back end components 122 may include a quarantine system 124, temporary storage system 126, permanent storage server 128, a firewall 130 and a load balancer 132. The back end components may communicate with each other through a communication network 133 such as a local area network or other type of suitable network (e.g., the Internet, a metropolitan area network (MAN), a wide area network (WAN), a mobile, a wired or wireless network, a private network, a virtual private network, etc.).

In some embodiments, file upload and review system 100 in general and the web server 102 in particular may include computer-executable instructions 134. The instructions 134 may instantiate the upload tool 116 or send instructions to the computing device 108 to instantiate a GUI 110 for the upload tool 116 using the web browser application 118 of a computing device 108. In some embodiments, the web browser application 118, GUI 110, the upload tool 116 and elements of the data system 116 may be implemented at least partially on the web server 112. The web server 112 may use a processor 136 to execute instructions 134 to display the GUI 110 including the file 102 within a display of the computing device 108. The GUI 110 may allow a customer to access various data within the file upload and review system 100, edit or add data to the file upload and review system 100, and perform other actions within the file upload and review system 100. The web server 112 may be implemented in one of several known configurations via one or more servers configured to process web-based traffic received via the computer network 108 and may include load balancing, edge caching, proxy services, authentication services, etc.

In some embodiments, the quarantine data system 124 in general and the quarantine data server 138 in particular may include computer-executable instructions 140. The quarantine data server 138 may execute instructions 140 to instantiate a malware scanning tool 142, a credential management tool 144 and a firewall application 146. In some embodiments, the malware scanning tool 142, the credential management tool 144 and the firewall application 146 may be implemented at least partially on the quarantine data server 138. The temporary data system 124 may use one or more processors 148 to execute instructions 140.

In some embodiments, the temporary data system 126 in general and the temporary data server 150 in particular may include computer-executable instructions 152. The instructions 152 may instantiate a conversion tool 154 and a display tool 156. The temporary data server 150 may store the file 102 in a temporary storage 158. The temporary storage 158 may be a data storage device such as random-access memory (RAM), hard disk drive (HDD), flash memory, flash memory such as a solid state drive (SSD), etc. The instructions 152 may also instantiate the conversion tool 154, the display tool 156 or send instructions to the computing device 108 to instantiate a GUI 110 for the display tool 156 using the web browser application 114 of a computing device 108. In some embodiments, the web browser application 114, GUI 110, a conversion tool 154 and the display tool 156, and elements of the temporary data system 126 may be implemented at least partially on the temporary data server 150. The temporary data system 126 may use one or more processors 160 to execute instructions 152 to display the GUI 110 including the file 102 within a display of the computing device 108. The GUI 110 may allow a customer to access various files within the temporary data system 126, edit or add files to the temporary data system 126, and other actions with the temporary data system 126.

Figure 2:
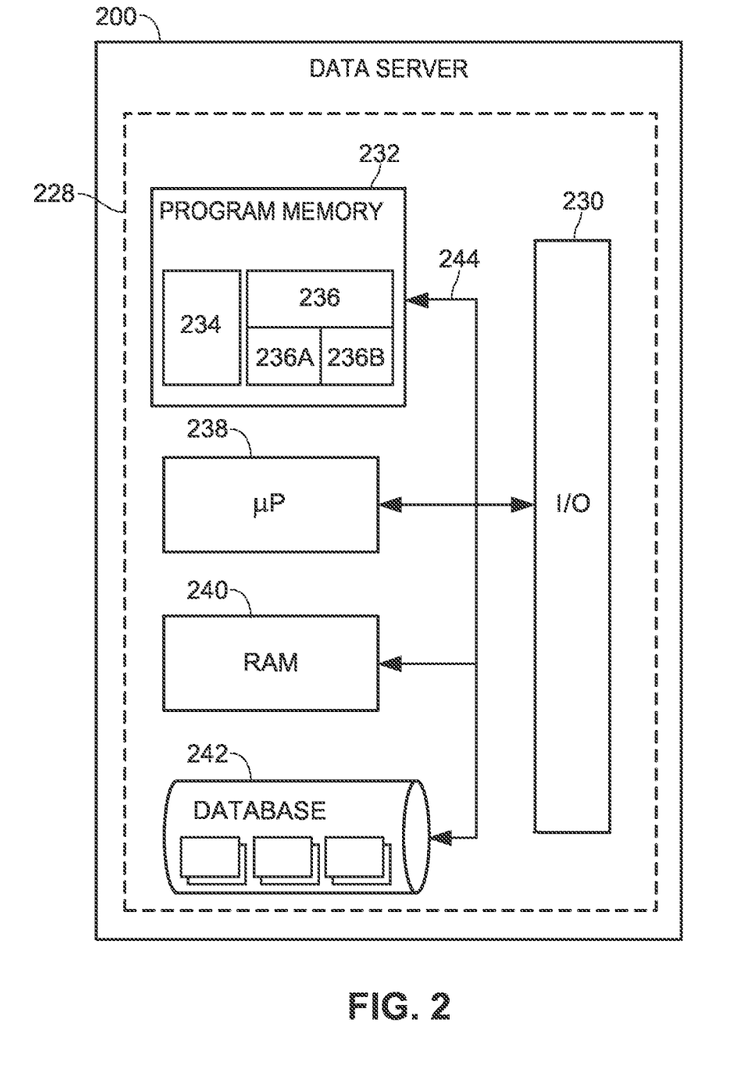
FIG. 2 is an exemplary architecture of server of a system for uploading and verifying a file.

Referring now to FIG. 2, a data server 200 includes a controller 228. Exemplary data servers include the web server 106, temporary data server 150, permanent data server 128 and the quarantine data server 138 as illustrated in FIG. 1. The controller 228 includes a program memory 232, a microcontroller or a microprocessor (μP) 238, a random-access memory (RAM) 240, and an input/output (I/O) circuit 230, all of which are interconnected via an address/data bus 244. The program memory 232 may store computer-executable instructions, which may be executed by the microprocessor 238. In some embodiments, the controller 228 may also include, or otherwise be communicatively connected to, a database 242 or other data storage mechanism (e.g., one or more hard disk drives, optical storage drives, solid state storage devices, etc.). It should be appreciated that although FIG. 1 depicts only one microprocessor 238, the controller 228 may include multiple microprocessors 238. Similarly, the memory 232 of the controller 228 may include multiple RAMs 234 and multiple program memories 236, 236A and 236B storing one or more corresponding server application modules, according to the controller's particular configuration. The data server 222 may also include specific routines to render the data into an image for display by a client computer (not depicted) such as the computing device 108 illustrated in FIG. 1.

Although FIG. 2 depicts the I/O circuit 230 as a single block, the I/O circuit 270 may include a number of different types of I/O circuits (not depicted), including but not limited to, additional load balancing equipment, firewalls, etc. The RAM(s) 234, 240 and the program memories 236, 236A and 236B may be implemented in a known form of computer storage media, including but not limited to, semiconductor memories, magnetically readable memories, and/or optically readable memories, for example, but does not include transitory media such as carrier waves.

Figure 3:
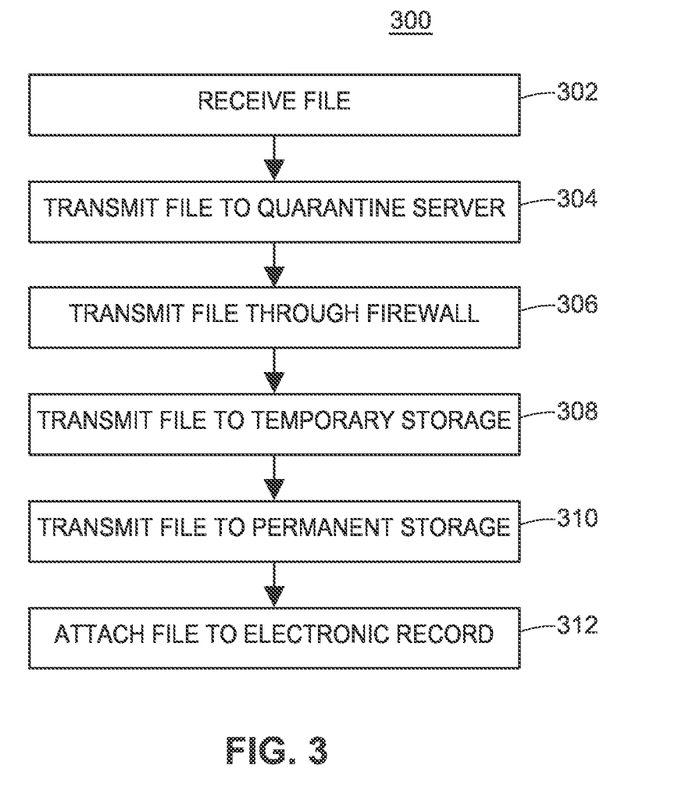
FIG. 3 is a flow chart illustrating an exemplary method for uploading and verifying a file.

FIG. 3 is a high level flowchart of a method, routine or process 300 for illustrating an exemplary method for uploading and verifying a file. A user, may use a client device, such as the computing device 108 illustrated in FIG. 1 to access a company website. The user may be, for example, a customer of the company, a holder of an insurance policy of the company, a beneficiary of a policy, a claimant, an insurance agent with the company or some other employee or independent contractor affiliated with the company. Accordingly, the user may have one or more files, such as a text document or image, that the user wishes to be uploaded and attached to an electronic record of a claim. Once the file has been uploaded by the user, the document may be received by a first data server, such as the quarantine server 138 illustrated in FIG. 1. For example, if a customer has uploaded a file to associate with a claim, the file may be transmitted to a quarantine server to be scanned by a web security application scan, as described below in reference to FIG. 4. The first data server may then transmit the document through a firewall (block 306) to a second data server (block 308), such as the temporary storage server 150 illustrated in FIG. 1. In an alternate embodiment, the file may be uploaded by a trusted user or a user accessing the system from the company network, such as an employee of the company or an independent contractor associated with the company, such as an insurance agent, and the file may be sent directly to the second data server instead of first being transmitted to the first server to be scanned by a web security application. The second data server may transmit the document to a third data server, such as the permanent storage server 128 illustrated in FIG. 1 (block 310). The second data server or third data server may flag the file, so that it is attached to the electronic record of the insurance claim (block 312).

Figure 4A:
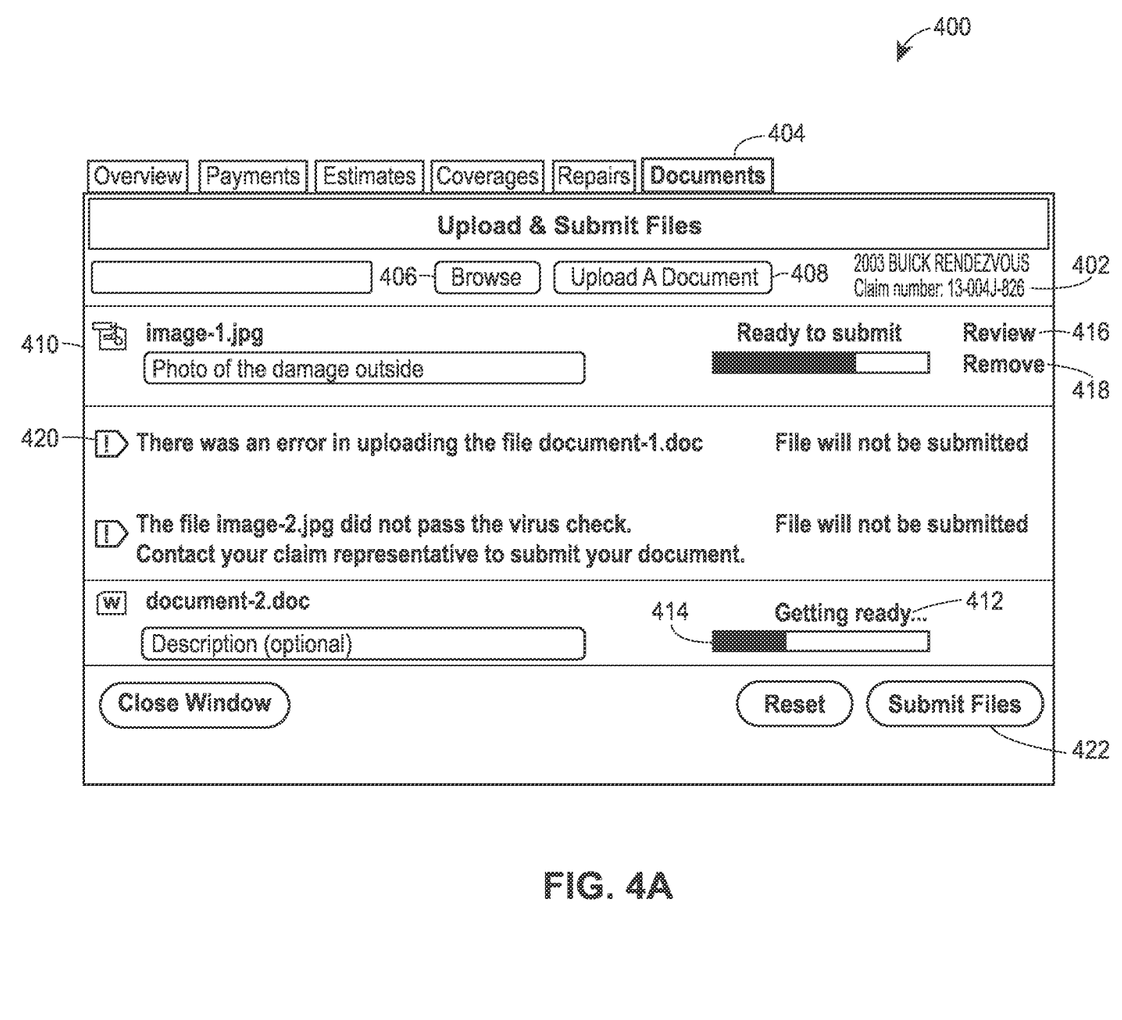
FIG. 4A is an exemplary layout of a user account page.

Turning now to FIG. 4A, a user account page 400 may allow a user to see one or more insurance claims 402 that the user may be involved in. The account page 400 may display a variety of actions associated with the user account, which the user can perform, such as a document tab 404 to facilitate the uploading and reviewing of files which the user would like to attach to the electronic file of the insurance claim. The documents tab 404 may also display a browse button 406 and an upload button 408. The browse button 406 may cause the computing device to load an explorer window to allow the user to choose a document. In alternate embodiments, the interface may be a drag and drop interface. An upload button 408 may also be displayed to allow a user to upload the document. Once the document has been uploaded, the document may be displayed on the file list 410 of account page 400. A status message 412 may show the progress of the document being uploaded. For example, if the document is still being uploaded from the client device to the company server, the status message may inform the user that the document is "getting ready." Furthermore, a status bar 414 may display the user's progress in uploading and reviewing the document. For example, the status bar 414 may be split into three sections. After the file has been selected by the user and is currently being uploaded to the data server, the first portion of the status bar may be filled in. Once the file has been uploaded to the data server, the second portion of the status bar may be completed. Once the user has verified the document, the third portion of the status bar may be completed. A review button 416 may allow a user to view the document, after it has been uploaded to the data server and allow the user to verify its accuracy. A remove button 418, may allow the user to remove or delete a document which they no longer wish to upload. If there is a problem uploading the document, such as an error in uploading, or if a document does not pass a virus check (a warning message 420 may be displayed. A submit button 422 allows the user to submit the files once the files have been uploaded and reviewed.

Figure 4B:
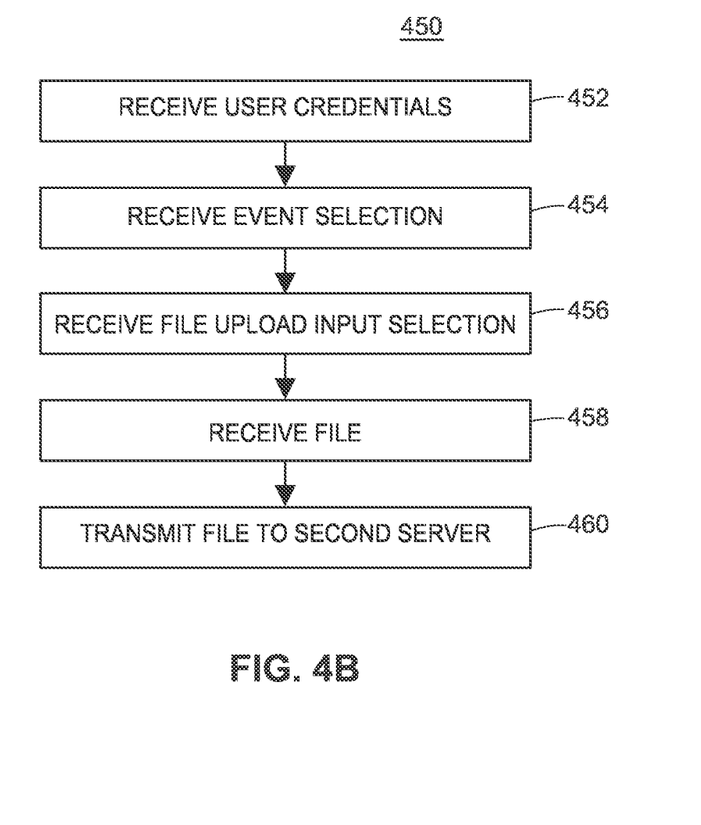
FIG. 4B is a flow chart illustrating an exemplary method for receiving a file and scanning the file.

FIG. 4B is a flowchart of a method, routine or process 450 for selecting and uploading a file associated with an event, such as an insurance claim. A user, may use a client device, such as the computing device 108 illustrated in FIG. 1, to log on to a company website or application using login credentials such as a username and password. A data server, such as the web server 112 illustrated in FIG. 1, may receive the user credentials (block 452) and direct the user to a user account page (such as user account page 400 as illustrated in FIG. 4A). The data server may send instructions to the client device to display a plurality of information related to an event associated with the company, such as an insurance claim 402 as illustrated in FIG. 4A. For example, a customer may have one or more insurance claims filed with the company or an insurance agent may handle one or more insurance claims filed by customers of the company. The user may select one of the events, to which the user would like to upload and attach a file, by selecting a documents tab 404. The selection may be in the form of a user input such as a touchscreen press, mouse button press, keyboard button press, etc. A data server, such as the web server 112 of FIG. 1, may receive the user input (block 454) and the data server may send instructions to the client device to display a plurality of information associated with the claim and a variety of options, such as a documents tab (such as documents tab 404 of FIG. 4A). The variety of options may be represented by tabs, web buttons, radio buttons, etc. Each option may have one or more input mechanisms, each mechanism representing an action which the user may take. For example, there may be an "upload a document" input, such as upload button 408 of FIG. 4B) which allows a user to upload a file.

Accordingly, when the user wishes to upload a file, the user may select the upload file input. Once the user has selected the upload file input, the data server receives the file upload input selection (block 456) and may send instructions to the client device to display a file upload interface, such as a drag and drop interface, file browser interface, etc. The user may use the interface to select a file to upload and make an input representing a selection to upload the file. Accordingly, the client device may transmit the file to the data server. The data server may receive the file (block 458) and may further transmit the file to a second data server, such as the quarantine server 138 illustrated in FIG. 1 (block 460). In an alternate embodiment, the data server may also transmit the credentials to the second data server.

Figure 5:
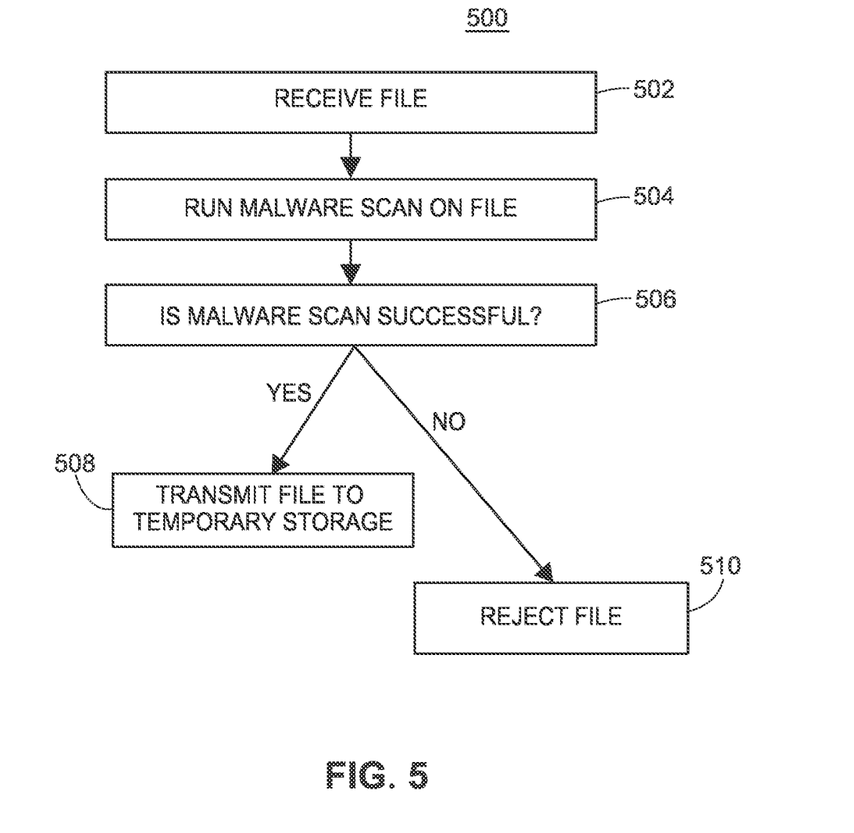
FIG. 5 is a flow chart illustrating an exemplary method for receiving a file and scanning the file.

FIG. 5 is a flowchart of a method, routine or process 500 for selecting and uploading a file associated with an event, such as an insurance claim. After the file has been uploaded by the user (for example according to the method 400 described in FIG. 4), the file may be transmitted to and received by a data server, such as the quarantine server of FIG. 1 (block 502). The file may be received by the quarantine server in order to scan the file, ensure that the file is secure and does not contain any malicious code. Accordingly, the quarantine server may be separated from the company network by one or more firewalls (software or hardware), in order to prevent any malicious code from infecting the company's primary system. After receiving the file, the data server may run a Web Security application to scan the file for malware, viruses, etc. (block 504). If the web security application scan is successful (YES branch of block 506), the data server may transmit the file through a firewall to a temporary data server (block 508) (such as the temporary data server 150 of FIG. 1). The firewall may be a software firewall, hardware firewall, a combination of the two, etc. In an alternate embodiment, the data server may also run an application which passes a customer's login credentials to the temporary data server.

If the web security application scan is not successful (NO branch of block 506), the data server may reject the document and end the routine 500 (block 510). In an alternate embodiment, the data server may generate and display a message to the customer indicating that the file has failed the web security application scan (block 510). The message may suggest that the customer try to upload a different file or contact their insurance agent for further details. In an alternate embodiment, the web security application may attempt to remove any malware from the file. If the removal is successful, the data server may transmit the file through a firewall to a temporary data server (such as the temporary data server 150 of FIG. 1).

In another embodiment, (not shown) the quarantine server may scan the document for malware, viruses, etc., as the document is being transmitted through the quarantine server to the temporary data server. In this way, the quarantine server serves as a "pass through" point, while still preventing any malware, viruses, etc. from accessing the main network. Of course these are only examples of how the quarantine server can be implemented and it is envisioned that the present system can incorporate any quarantine server which scans the document while preventing the document from accessing the rest of the network.

Figure 6:
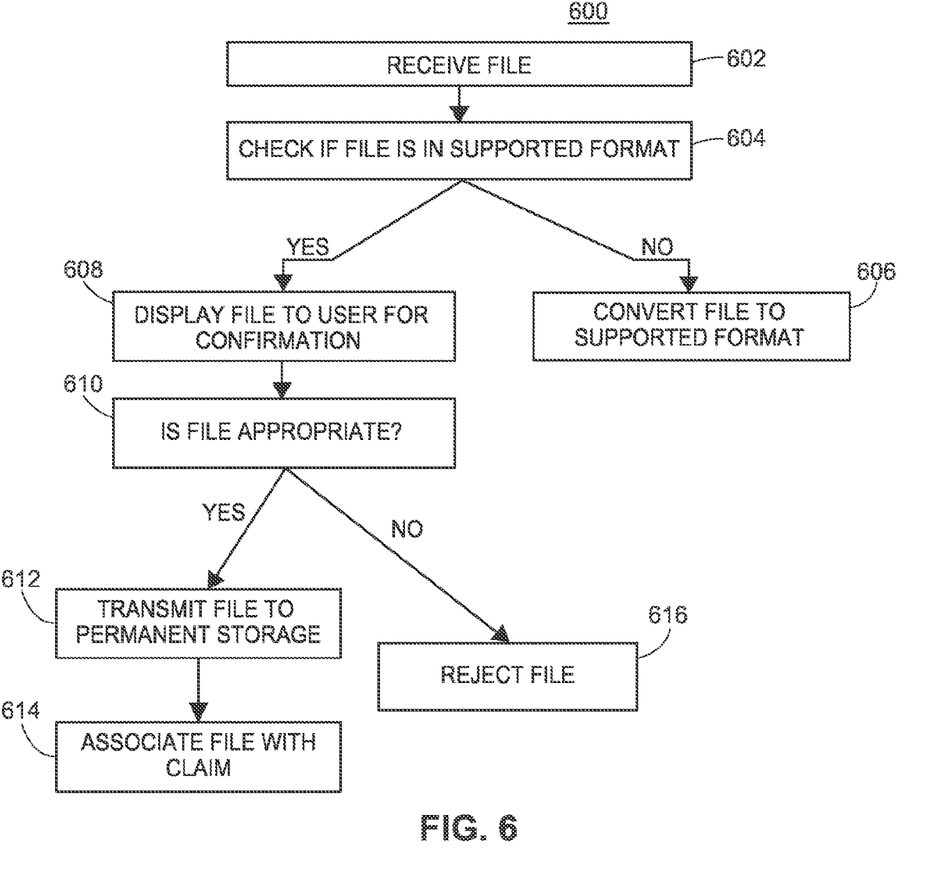
FIG. 6 is a flow chart illustrating an exemplary method for displaying a file for confirmation.

FIG. 6 is a flowchart of a method, routine or process 600 for displaying a file for confirmation. The method may be performed on one or more data servers, such as the temporary storage server 150 illustrated in FIG. 1. The file is first received by the data server (block 602). In an alternate embodiment, the temporary data server may also receive the user credentials and claim number associated with the file. Once the temporary data server has received the file, the temporary data server may determine if the file is in a supported formatted (block 604). For example, the system 100 may only support files in JPEG, PDF, TIFF, DOC, XLS, DOCX, XLSX, etc. If the data server determines that the file is not in a supported format (NO branch of block 604), the data server may convert the file into a supported format (block 606). For example, if the file is the .ODF (Open File Format) and that format is not supported by the system 100, the data server may convert the file into the PDF format. Of course, certain embodiments of the present invention may natively support ODF files. Once the file has been converted, the data server may display the file to the user for confirmation (block 608). Accordingly, the data server may transmit the document over a network, such as the Internet, so that the converted file can be viewed by the user on a client device, such as the computing device 108 illustrated in FIG. 1. The user may then examine the file to confirm that the correct file was selected and/or that there are no errors in the file. If the file has been compressed (such as the method 700 discussed below in reference to FIG. 7), the user may also determine if the compression algorithm applied to the file is acceptable. Once the user has decided whether the file is acceptable, the user may enter an input representing a verification that the file upload is acceptable. The verification input may be in the form of a mouse click, touch screen press, keyboard button press, etc. After the selection has been input, the data server may receive the selection. If the selection input indicates that the file is acceptable (YES branch of block 610), the data server may transmit the file to a permanent storage database (block 612). In an alternate embodiment, the data server may automatically associate the file with the claim number and flag the file, in response to receiving the file. The data server may also make an indication permanently associating the file with the claim number and flagging the file so that the file is attached to the electronic record of the claim (block 614). If the selection input indicates that the file is not acceptable (NO branch of block 610), the data server may reject the document (block 616) and end the routine 600. In an alternate embodiment, the data server may generate and display a message to the customer indicating that the file has not been verified. The message may suggest that the customer try to upload a different file or contact their agent for further details.

If the data server determines that the file is in a supported format (YES branch of block 510), the data server may display the file to the user for confirmation (block 608) and continue the routine 600 from block 608 as discussed above.

Figure 7:
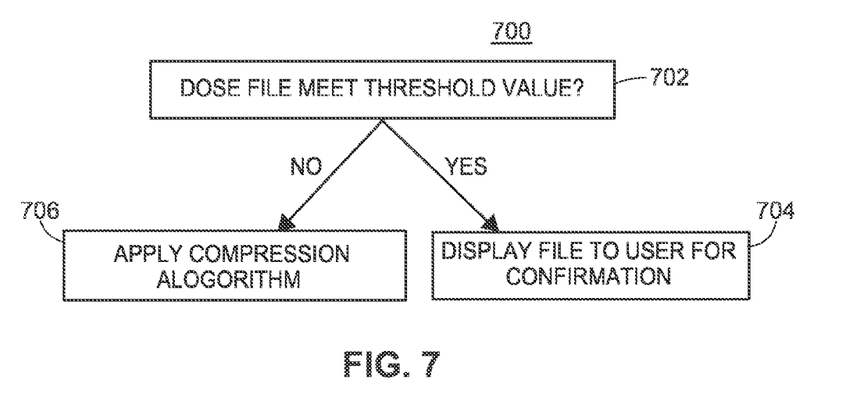
FIG. 7 is a flow chart illustrating an exemplary method for compressing a file and displaying the file to the user for review.

FIG. 7 is a flowchart of a method, routine or process 700 for compressing a file and displaying the file to the user for review. The method may be performed on one or more data servers, such as the temporary storage server 126 illustrated in FIG. 1. When submitting files to be attached to claims, a user may submit numerous pictures, documents, or other large files. In the interest of space, the data server 126 may compress files that do not meet a certain threshold value. Exemplary threshold values include file type (such as JPEGs or other images), file size values (i.e. 2 Megabytes (MB)), etc. For example, the data server 126 may compress files that are larger than 2 MB or may compress all files in the JPEG format. However, when documents, such as large images, are compressed one or more times by the company's system to reduce storage costs, compression artifacts may cause a loss of detail in the image, obscuring important portions of the image. For example, if an image has been uploaded to show damage to a car, and has consequently been compressed one or more times, certain pertinent details may no longer be visible in the image and the file is thus unacceptable to be uploaded and associated with the file. In such an instance, the user may make an input indicating that the file is not acceptable for upload. Accordingly, the data server 120 may first determine if the file meets the threshold value (block 702). If the data server 126 determines that the file does meet the threshold value (YES branch of block 702), the data server 126 may then present the file to the user for verification (block 704) (such as the method 600 discussed above in reference to FIG. 6).

If the data server 126 determines that the file does not meet the threshold value (NO branch of block 702), the data server 126 may apply one or more compression algorithms to the file (block 706). Once the one or more algorithms have been applied, the data server 126 may again determine if the files meets the threshold value (block 702). At this point, the routine 700 may continue, as discussed above, until the file meets the threshold value. Once the data server determines that the file meets the threshold value (NO branch of block 702), the data server may then present the file to the user for verification (block 704) (such as described the method 600 discussed above in reference to FIG. 6).

The following additional considerations apply to the foregoing discussion. Throughout this specification, plural instances may implement functions, components, operations, or structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The methods described in this application may include one or more functions or routines in the form of non-transitory computer-executable instructions that are stored in a tangible computer-readable storage medium and executed using a processor of a computing device (e.g., the computing device 102, the server 120, or any combination of computing devices within the system 100). The routines may be included as part of any of the modules described in relation to FIG. 1 or 2 or as part of a module that is external to the system illustrated by FIGS. 1 and 2. For example, the methods may be part of a browser application or an application running on the computing device 102 as a plug-in or other module of the browser application. Further, the methods may be employed as "software-as-a-service" to provide a computing device 102 with access to the data system 104.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or more processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data and data structures stored as bits or binary digital signals within a machine memory (e.g., a computer memory). These algorithms or symbolic representations are examples of techniques used by those of ordinary skill in the data processing arts to convey the substance of their work to others skilled in the art. As used herein, a "function" or an "algorithm" or a "routine" is a self-consistent sequence of operations or similar processing leading to a desired result. In this context, functions, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a function, process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a computer system 100 for purposes of illustration only. One of ordinary skill in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for segmenting a customer base and implementing specific behaviors for each customer segment through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

To the extent that any meaning or definition of a term in this file conflicts with any meaning or definition of the same term in a file incorporated by reference, the meaning or definition assigned to that term in this file shall govern. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A computer implemented method for attaching a file to an electronic record of an insurance claim or insurance policy, the method comprising:
   receiving, via a computer network, at a backend server associated with a first entity, a first file originating from a client device associated with a second entity, wherein the first file is in a first format and the first file corresponds to an insurance claim;
   scanning the first file to determine if the first file contains malware;
   removing the malware from the first file when it is determined that the first file contains malware;
   determining, by the one or more processors of the backend server associated with the first entity, whether the first file meets a supported threshold value;
   wherein, when it is determined that the first file format does not meet the threshold value, converting, by the one or more processors of the backend server associated with the first entity, the first file to a compressed file by applying a compression algorithm to the first file, wherein the compressed file meets the supported threshold value;
   transmitting, from the backend server associated with the first entity, over the computer network, the compressed file to the client device associated with the second entity, for a confirmation from the client device associated with the second entity, that the compressed file does not contain one or more compression artifacts and that the compressed file is appropriate for attachment to the insurance claim or insurance policy;
   receiving, at the backend server associated with the first entity, the confirmation that the compressed file is appropriate for attachment, wherein the confirmation is received in response to the confirmation transmission and the confirmation originates from the client device associated with the second entity;
   attaching, by the one or more processors of the backend server associated with the first entity, the compressed file to the electronic record of the insurance claim or insurance policy;
   storing the compressed file on a storage medium.

2. The method of claim 1, wherein the supported threshold value is a file size of the first file.

3. The method of claim 1, further comprising:
   transmitting, over the computer network, the first file to a quarantine server.

4. The method of claim 1, further comprising:
   receiving, over the computer network, a user credential at the backend server associated with the first entity.

5. A computer device for attaching a file to an electronic record of an insurance claim or insurance policy, wherein the computer device is associated with a first entity, the computer device comprising:
   one or more hardware processors; and
   one or more memories coupled to the one or more hardware processors;
   wherein the one or more memories include non-transitory computer executable instructions stored therein that, when executed by the one or more hardware processors, cause the one or more hardware processors to:
   receive, at the computer device, a first file originating from a client device, via a computer network, wherein the file is in a first format;
   scan the first file to determine if the first file contains malware;
   remove the malware from the first file when it is determined that the first file contains malware;
   determine whether the first format meets a supported threshold value;
   wherein, when it is determined that the first file does not meet the supported threshold value, convert the first file to a compressed file by applying a compression algorithm to the first file, wherein the compressed file meets the supported threshold value;
   transmit, from the computer device, over the computer network, the compressed file for a confirmation that the compressed file does not contain one or more compression artifacts and that the compressed file is appropriate for attachment to the insurance claim or insurance policy;
   receive, at the computer device, a confirmation that the compressed file is appropriate for attachment, wherein the confirmation originates from the client device and the confirmation is received in response to the confirmation transmission;
   attach the compressed file to the electronic record of the insurance claim or insurance policy; and
   store the compressed file on a storage medium.

6. The computer device of claim 5, wherein the threshold value is a file size.

7. The computer device of claim 5, wherein the non-transitory computer executable instructions further cause the one or more hardware processors to:
   transmit, over the computer network, the first file to a quarantine server.

8. The computer device of claim 5, wherein the non-transitory computer executable instructions further cause the one or more hardware processors to receive, over the computer network, a user credential at the computer device.

9. A computer readable storage medium comprising non-transitory computer readable instructions stored thereon for attaching a file to an electronic record of an insurance claim or insurance policy, the instructions when executed on one or more processors cause the one or more processors to;
   receive, via a computer network, at a backend server associated with a first entity, a first file originating from a client device associated with a second entity, wherein the first file is in a first format and the first file corresponds to an insurance claim;
   scan the first file to determine if the first file contains malware;
   remove the malware from the first file when it is determined that the first file contains malware;
   determine, at one or more processors of the backend server associated with the first entity, whether the first file meets a supported threshold value;
   convert the first file to a compressed file by applying a compression algorithm to the first file when it is determined that the first file does not meet the supported threshold value, wherein the compressed file meets the supported threshold value;
   transmit, from the backend server associated with the first entity, over the computer network, the compressed file to the client device associated with the second entity, for a confirmation originating from the client device associated with the second entity, that the compressed file does not contain one or more compression artifacts and that the compressed file is appropriate for attachment;

receive at the backend server associated with the first entity, the confirmation that the compressed file is appropriate for attachment and that the converted file has the sufficient level of detail for processing of the insurance claim, wherein the confirmation is received in response to the confirmation transmission and the confirmation originates from the client device associated with the second entity;

attach, at the one or more processors of the backend server associated with the first entity, the compressed file to the electronic record of the insurance claim or insurance policy; and store the compressed file on a storage medium.

10. The computer readable medium of claim 9, wherein the instructions when executed on the one or more processors further cause the one or more processors to:
identify the threshold value as a file size.

11. The computer readable medium of claim 9, wherein the instructions when executed on the one or more processors further cause the one or more processors to:
transmit, over the computer network, the file to a quarantine server.

12. The computer readable medium of claim 9, wherein the instructions when executed on the one or more processors further cause the one or more processors to:
receive, over the computer network, a user credential at the backend server.

* * * * *